United States Patent
Hrabovsky et al.

(10) Patent No.: US 10,838,927 B2
(45) Date of Patent: Nov. 17, 2020

(54) SYSTEMS AND METHODS FOR MODELLING VIRTUAL SCHEMAS IN NON-RELATIONAL DATABASES

(71) Applicant: MongoDB, Inc., New York, NY (US)

(72) Inventors: Lucas Hrabovsky, Philadelphia, PA (US); Thomas Ruecksteiss, Surrey Hills (AU); Matt Kangas, Hastings On Hudson, NY (US); Eliot Horowitz, New York, NY (US)

(73) Assignee: MongoDB, Inc., New York, NY (US)

( * ) Notice: Subject to any disclaimer, the term of this patent is extended or adjusted under 35 U.S.C. 154(b) by 380 days.

(21) Appl. No.: 15/223,654

(22) Filed: Jul. 29, 2016

(65) Prior Publication Data

US 2017/0161341 A1 Jun. 8, 2017

Related U.S. Application Data

(60) Provisional application No. 62/355,470, filed on Jun. 28, 2016, provisional application No. 62/262,942, filed on Dec. 4, 2015.

(51) Int. Cl.
*G06F 16/21* (2019.01)
*G06T 11/20* (2006.01)

(52) U.S. Cl.
CPC ............ *G06F 16/21* (2019.01); *G06T 11/206* (2013.01)

(58) Field of Classification Search
CPC combination set(s) only.
See application file for complete search history.

(56) References Cited

U.S. PATENT DOCUMENTS

| | | | |
|---|---|---|---|
| 6,405,195 B1 * | 6/2002 | Ahlberg | G06F 17/30398 707/954 |
| 7,800,613 B2 | 9/2010 | Hanrahan et al. | |
| 8,296,200 B2 * | 10/2012 | Mangipudi | G06F 17/30554 705/30 |
| 8,510,349 B1 * | 8/2013 | Puttick | G06F 17/30463 707/805 |
| 9,671,944 B2 * | 6/2017 | Hanumara | G06F 3/04847 |
| 9,747,360 B2 * | 8/2017 | Xue | G06F 16/245 |
| 9,886,483 B1 * | 2/2018 | Harrison | G06F 16/28 |
| 10,169,446 B1 * | 1/2019 | Garlapati | G06F 16/284 |
| 2002/0149614 A1 * | 10/2002 | Biebesheimer | G06F 17/30528 715/738 |
| 2004/0181543 A1 * | 9/2004 | Wu | G06F 17/30572 |
| 2005/0288957 A1 * | 12/2005 | Eraker | G06Q 30/00 345/630 |

(Continued)

OTHER PUBLICATIONS

U.S. Appl. No. 15/605,032, filed May 25, 2017, Horowitz et al.
U.S. Appl. No. 15/605,069, filed May 25, 2017, Horowitz et al.
U.S. Appl. No. 15/625,906, filed Jun. 16, 2017, Horowitz et al.

*Primary Examiner* — Hien L Duong
(74) *Attorney, Agent, or Firm* — Wolf, Greenfield & Sacks, P.C.

(57) ABSTRACT

One aspect relates to generating a unifying virtual schema in a non-relational database. A database is analyzed either in its entirety, or in part by using a sample of the database as a representative portion of the database as a whole. Common attributes within the database may be identified, ranked and displayed to a user through one or more of various visualizations. In other examples, the user may further refine the way the data is displayed and how much is displayed by interacting with a user interface.

23 Claims, 14 Drawing Sheets

(56) References Cited

U.S. PATENT DOCUMENTS

| | | | |
|---|---|---|---|
| 2005/0288959 A1* | 12/2005 | Eraker | G06F 17/3087 705/1.1 |
| 2008/0086451 A1* | 4/2008 | Torres | G06F 17/30696 |
| 2009/0299766 A1* | 12/2009 | Friedlander | G06Q 10/00 705/3 |
| 2010/0169360 A1* | 7/2010 | Cohen | G06F 16/24578 707/769 |
| 2010/0251156 A1* | 9/2010 | Cantwell | G06Q 10/06 715/771 |
| 2010/0299348 A1 | 11/2010 | Gill et al. | |
| 2011/0298804 A1* | 12/2011 | Hao | G06T 11/40 345/440 |
| 2013/0007070 A1 | 1/2013 | Pitschke | |
| 2013/0091170 A1* | 4/2013 | Zhang | G06F 21/30 707/783 |
| 2014/0095549 A1* | 4/2014 | Shi | G06F 16/211 707/803 |
| 2014/0278754 A1 | 9/2014 | Cronin et al. | |
| 2014/0278778 A1* | 9/2014 | Regan | G06Q 10/04 705/7.31 |
| 2015/0082219 A1* | 3/2015 | Beck | G06Q 10/06 715/771 |
| 2015/0242407 A1 | 8/2015 | Frohock et al. | |
| 2015/0310005 A1* | 10/2015 | Ryger | G06F 17/30011 707/706 |
| 2016/0092530 A1* | 3/2016 | Jakubiak | G06F 17/30572 715/202 |
| 2016/0092594 A1* | 3/2016 | Deshmukh | G06F 17/30448 707/763 |
| 2016/0180439 A1* | 6/2016 | Sherman | G06Q 30/0631 705/26.7 |
| 2016/0224594 A1* | 8/2016 | Chow | G06F 16/211 |
| 2016/0275134 A1 | 9/2016 | Tandel et al. | |
| 2017/0052747 A1* | 2/2017 | Cervelli | G06F 3/0482 |
| 2017/0068712 A1* | 3/2017 | Streufert | G06F 17/30554 |
| 2017/0068718 A1 | 3/2017 | Schaffer | |
| 2017/0161341 A1* | 6/2017 | Hrabovsky | G06F 17/30289 |
| 2017/0177792 A1* | 6/2017 | Majumdar | G06F 19/22 |
| 2017/0248944 A1* | 8/2017 | Rath | G05B 23/0286 |
| 2017/0262440 A1 | 9/2017 | Horowitz et al. | |
| 2017/0262441 A1 | 9/2017 | Horowitz et al. | |
| 2017/0286532 A1 | 10/2017 | Horowitz et al. | |

\* cited by examiner

FIG. 4A last_login
date
FIG. 7A
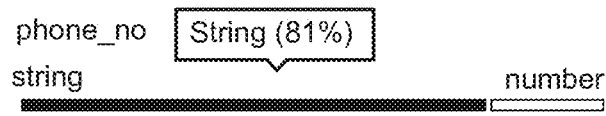
FIG. 7B
FIG. 7C
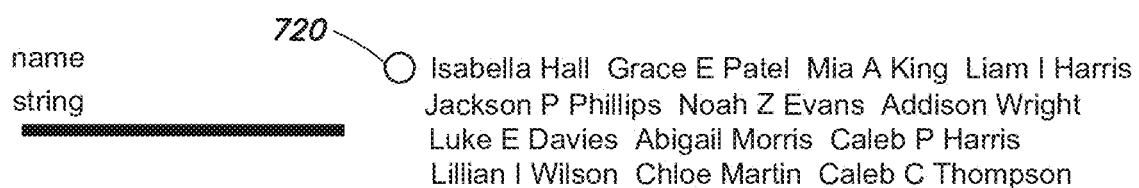
FIG. 7D phone_no
string                        number

FIG. 7G
○ 7090720802  3649233037  6524357321  5602399320
  1285736740  1018221972  3653033788  9204523961
  3621273185  5472872262  4905553455  2484518631
  1191817520  4184290014  6871010178 age
number                        undefined

FIG. 7H
13% ┆
6.5% ┆
0%   └──────────────────────
     min:15            max:56

730
▸address
 document

FIG. 7I  Document with 4 nested fields  740

SYSTEMS AND METHODS FOR MODELLING VIRTUAL SCHEMAS IN NON-RELATIONAL DATABASES

RELATED APPLICATIONS

This application claims priority under 35 U.S.C. § 119(e) to U.S. Provisional Application Ser. No. 62/355,470 entitled "SYSTEMS AND METHODS FOR MODELLING VIRTUAL SCHEMAS IN NON-RELATIONAL DATABASES," filed on Jun. 28, 2016, and to U.S. Provisional Application Ser. No. 62/262,942 entitled "SYSTEMS AND METHODS FOR MODELLING VIRTUAL SCHEMAS IN NON-RELATIONAL DATABASES," filed on Dec. 4, 2015, which applications are incorporated herein by reference in their entirety.

BACKGROUND

Relational databases have traditionally been used as the structure of choice for storing bodies of information. Such databases recognize relationships amongst stored items, organizing data into rows and columns, wherein rows denote an attribute and columns denote a value for said attribute. For example, a company may have a database of employee files, wherein one row may be dedicated to employees' names, the next row may be dedicated to employee phone numbers, and so forth. Each column may be dedicated to an employee and contain the values associated with that employee in the corresponding rows.

Relational databases can be impractical for the growing demands of "big data," as the amount of information required to be stored in a single database has become too unwieldy for such a system. Accordingly, some implementations use non-relational databases to resolve the above-identified issues of relational systems. However, because non-relational databases lack a unifying schema to quickly identify attributes and their associated values, analyzing said databases may be difficult and impractical with the present art.

SUMMARY

Accordingly, there is a need for a system capable of characterizing the contents of a non-relational or dynamic schema database and displaying its properties to a user. By characterizing the contents of a database, a model of the architecture of the data within the database can be generated. In some embodiments, that model is based on samples taken from the database, providing a probabilistic model or virtual schema for improving understanding of the entire database or a selected portion of the database. Although models based on sampled data can only be representative of the underlying database, computational efficiency is increased by using samples of the database and analyzing elements of the sampled data. In some instances, analyzing an entire database to derive a data model is computationally prohibitive. Thus, generating virtual schemas (e.g., probabilistic data models) improves efficiency and provides reasonable certainty on data structure, from which users can infer broader understanding of the entire database. Various embodiments of the system are configured to build navigable and/or selectable visualizations of the virtual schemas. The visual depictions of the virtual schemas enable intuitive understanding of the data architecture even in "schema-less" or dynamic schema settings. According to one aspect, the system automatically generates the virtual schema for a database based on analysis of a sampled data set, enabling the system to build a probabilistic model of the data contained in the database.

According to another aspect, analysis of the data elements and structures even in a non-relational or dynamic schema database allows a user to gain insight into the database. In some embodiments, the system presents user interfaces that enable a user to select a portion of, or all of, the database for analysis. Responsive to selection, the system is configured to sample a portion of the database, thus creating a "window" into the database from the sampled data. In one embodiment, this sampled data can be used to represent the entire database as a whole. The sample can be a random sample, or may be sampled selectively from a given database.

According to one embodiment, the analysis of the sampled data is used to model the properties of the data, and build a "window" from which to analyze the entire database efficiently and with reasonable overhead. In some embodiments, samples can be restricted to portions of the database (e.g., identified by the user) and analysis of portions of the database or the data set in some embodiments allows the "window" to be focused or tailored to specific portions of the database selected by the user (e.g., by queries or filters, or specifying portions of the database in user interfaces).

According to yet another aspect, a user interface ("UI") is provided to enable user interaction with the sampled data taken from a portion of the database, or in some examples, the entire database. The UI can, in one example, display the results of the data analysis (e.g., virtual schema) such that the user can readily identify the attributes that are most likely to be present in the entire data set based on the sampling. For example, common attributes can be identified based on a ranked order (e.g., based on frequency of occurrence in the sample data) of the attributes in the UI. In at least one example, a threshold specified by the user limits the number of attributes listed in the ranked order of the attributes. In another example, the UI can graphically depict the values associated with those attributes such that the distribution of the values and the trends within the analyzed data are displayed to the user. In further embodiments, the user may interact with visualizations associated with the data set to expand on the displayed information.

According to at least one aspect, the database or the portion of the database to be sampled can be sampled randomly or selectively. In one example, selective sampling can be performed to collect a sample that is indicative of the contents of the database or portion of the database from which the sample is collected. In some examples, the sampling process, whether random or selective, can continue until a confidence threshold is met.

In some aspects, specification of a database or portion of a database to sample is performed by a user. In other aspects, specification of a database or portion of a database to sample is performed automatically by the system. Automatic data selection can, in some examples, be performed based on data usage information or other attributes.

According to another aspect, enhancements to the user interface can be implemented in conjunction with probabilistic modelling of database data or can be implemented as stand-alone features of an improved user interface for interacting with database data. According to one embodiment, the user interface is configured to analyze data attributes and generate a visualization based on one or more types of data represented in the database or database collection. In one embodiment, the user interface displays the data types of fields in a collection's schema. In another, the user interface can also displays a percentage breakdown for fields with varying data types across documents.

To provide one example of varying visualizations in the UI that are based on field type: if all the documents in the collection have unique strings for a given field, the user interface is configured to display a random selection of string values (e.g., name field of string type); if there are only a handful of unique string values (e.g., 1-2, 2-3, 3-4, 4-5, or 5-6, among other options), the user interface is configured to display the strings in a single graded bar, indicating the percentage breakdown of string values (e.g., membership_status of string type). When there are many different string values with some duplication, the user interface is configured to display a histogram indicating the frequency of each string found for that field (e.g., favorite_feature of string and undefined type). In one embodiment, the user interface is configured to response to a hover input via a mouse and pointer on each histogram bar to see a tool tip indicating the value of the string.

According to another aspect, the user interface is configured to enable visual query building while making selecting in the user interface. The user interface can be configured to display a query bar that reflects any selections made in the visualizations of the database data. In one embodiment, the user interface is configured to maintain state information on data samples that have been made to create a current visualization of the database (e.g., virtual schema and samples made to generate the virtual schema). Thus, the query builder bar can be configured to reflect any filters, selections, samples, etc. required to achieve the current visualized state coupled with any selections being made in the user interface. In other embodiments, the query can be built irrespective of current state or provide options for executing the built query against unfiltered/unsampled data.

According to one embodiment, the user interface is also configured to facilitate transitions from the data being visualized. For example, histogram displays of ranges of data can be specially configured to enables users to select an open-ended range. Such an "open-ended range" visual selection can be configured to enable Less-Than or Greater-Than selections in the user interface smoothly with single user clicks and drag operations. Further, the visual range selector is configured to respond to a user selecting within a displayed range and a pull-beyond (i.e. move/drag the visual pointer beyond) the displayed histogram, by expanding opening up the selectable ranged beyond what is currently displayed. In one example, this also triggers the query builder visualization to create and display a query in the query builder bar where the query includes values beyond the displayed range. In response to selections within the user interface that open up, for example, range displays, the user interface can also be configured to provide visual indication showing expanded selections (e.g., via highlighting beyond the displayed data (e.g., histogram) or vis outlined displays showing dimensions beyond displayed data, among other examples). In further examples, the query builder display can also highlight portions of the query that reflect opened-up data selections (e.g., expanded ranges).

According to one aspect, a system is provided. The system comprises at least one processor operatively connected to a memory, wherein the processor, when executing, is configured to accept a specification of a subset of data or an entire data set of a non-relational database, select data from the subset of the data or the entire data set to create sampled data, identify a plurality of common attributes within the sample data to build a virtual schema from the sampled data, and generate a visualization of the common attributes and mappings to the sampled data associated with the common attributes. According to one embodiment, the processor is configured to randomly sample the database to create the subset of data. According to one embodiment, the processor is configured to selectively sample the subset of data or the entire database. According to one embodiment, the processor is configured to sample the subset of data or the entire database until a confidence level received from the user is met. According to one embodiment, the system is configured to receive specification of a subset of data from a user. According to one embodiment, the system is configured to generate specification of a subset of data automatically. According to one embodiment, the system is configured to analyze data usage information or other attributes to automatically generate the specification of the subset of data. According to one embodiment, the system is configured to identify common attributes based on a ranked order of the attributes. According to one embodiment, the system is configured to limit the number of attributes listed in the ranked order of the attributes, based on determining that the number of attributes meets or exceeds a threshold.

According to one aspect, a method for generating a virtual schema in a non-relational database is provided. The method comprising acts of accepting, by a processor coupled to a memory, specification of a subset of data within a non-relational database or the entire non-relational database, sampling, by the processor, from the subset of data within the non-relational database or from the entire non-relational database, identifying, by the processor from within the sample, common attributes with which to build a virtual schema, and generating, by the processor, visualization of the common attributes, and mappings to the sampled data associated with the common attributes. According to one embodiment, the act of sampling from the subset of data or from the entire database includes an act of randomly sampling from the subset of data or from the entire database. According to one embodiment, the act of sampling from the subset of data or from the entire database includes an act of selectively sampling from the subset of data or from the entire database. According to one embodiment, the act of sampling from the subset of data or from the entire database may be performed until a confidence received from the user is met. According to one embodiment, the act of accepting specification of a subset of data includes receiving the specification from a user. According to one embodiment, the act of specifying a subset of data is performed automatically. According to one embodiment, the act of automatically specifying the subset of data is based on data usage information or other attributes. According to one embodiment, the act of identifying common attributes is based on a ranked order of the attributes. According to one embodiment, the number of attributes listed in the ranked order of the attributes is limited by a threshold received from a user.

Still other aspects, embodiments, and advantages of these exemplary aspects and embodiments, are discussed in detail below. Any embodiment disclosed herein may be combined with any other embodiment in any manner consistent with at least one of the objects, aims and needs disclosed herein, and references to "an embodiment," "some embodiments," "an alternate embodiment," "various embodiments," "one embodiment" or the like are not necessarily mutually exclusive and are intended to indicate that a particular feature, structure or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated and constitute a part of this specification. The drawings, together with the remainder of the specification, serve to explain principles and operations of the described and claimed aspects and embodiments.

BRIEF DESCRIPTION OF THE DRAWINGS

FIGS. 4A-B show another example of a user interface according to another embodiment;

DETAILED DESCRIPTION

Figure 1:
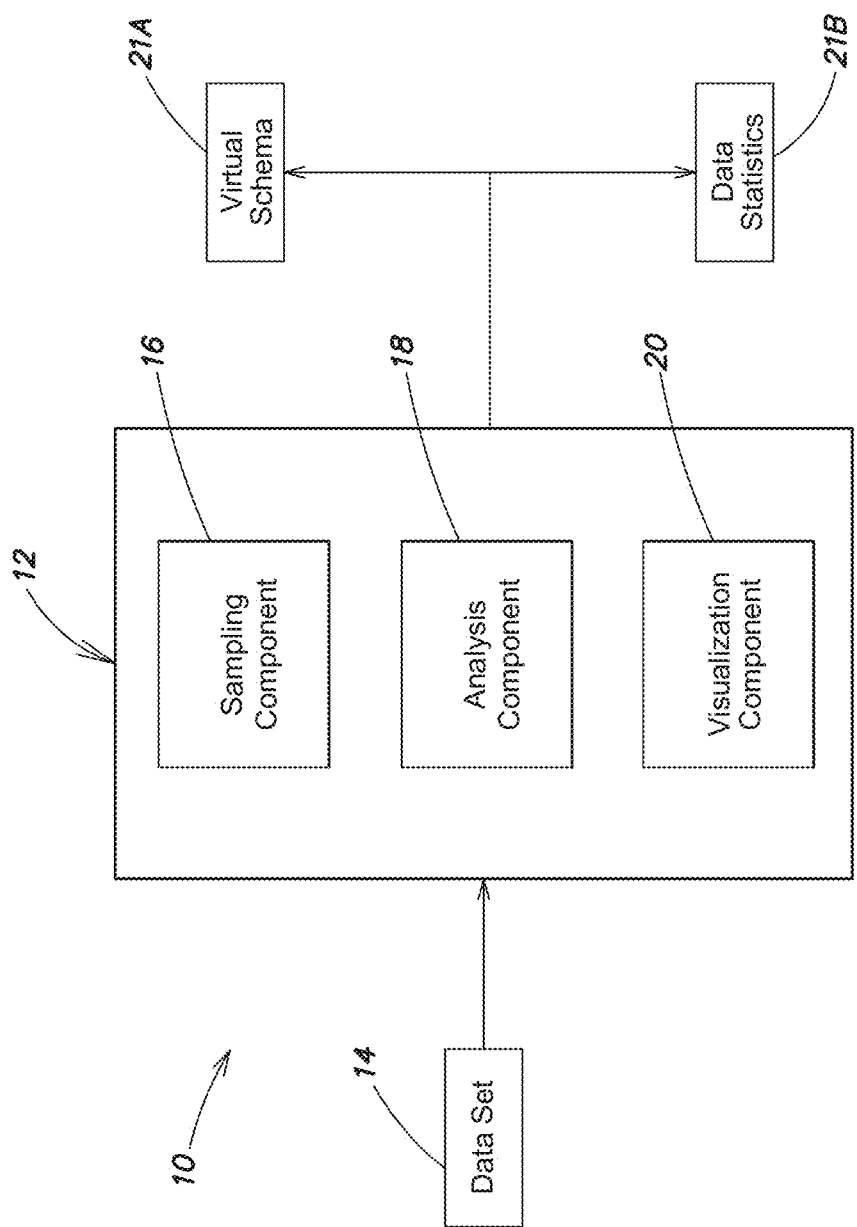
FIG. 1 shows a block diagram of a virtual schema system, according to one embodiment.

Stated broadly, various aspects herein describe methods and systems for analyzing data sets comprising attribute-value pairs in non-relational databases and/or databases with dynamic or evolving schemas (e.g., databases where each base unit of data storage can define its own schema). In one embodiment, this can involve sampling a portion of the data, analyzing the contents of the sample, and displaying the analyzed contents to a user. The analyzed contents can be displayed to a user through a user interface, listing the attributes and their values through associated visualizations of the underlying data. The user can, in at least one embodiment, interact with the graphically-displayed data to further refine and visualize the details of the data being displayed.

According to another aspect, the system is configured to facilitate user understanding and interaction with dynamically evolving data structures. For example, the system samples data for analysis, synthesizes a representative data architecture or virtual schema based on attributes of the sample set, and presents visualizations of the virtual schema with associations to the source data. An end user can interact with the visualizations to navigate to the source data, and the visualizations facilitate data accessibility and understanding.

The disclosure provided herein is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

FIG. 1 shows an overview 10 of a system 12 for analyzing a data set 14. According to one embodiment, the system 12 includes a sampling component 16, an analysis component 18 and a visualization component 20. In one example, the system 12 receives a user input specifying a data set 14, which contains at least one document, from a database including at least the data set 14. According to one embodiment, a document represents a base unit of data storage. A document can contain one or more attribute-value pairs. By way of example, an attribute may be "phone number," and the value associated with it may be a seven-digit phone number. In an environment that supports dynamic document structure (i.e., evolving data attributes and/or fields), the structure of the documents can quickly change in terms of the data being stored within a collection. Documents as a base unit of data storage can be based on the known JSON standard, or the document architecture can be based on the BSON standard employed by the known MONGODB database, among other examples. Collections are logical grouping of documents, which can be named and accessed, for example, via the collection's name.

According to one aspect, the system 12 is configured to facilitate user understanding and interaction with dynamically evolving document structures. For example, the system samples data for analysis, synthesizes a virtual schema based on attributes of the sample set, and presents visualization of the virtual schema with associations to the source data.

According to one embodiment, after the data set 14 is specified on the system 12 for analysis, the sampling component 16 can execute a process of sampling on the data set 14. In one example, a user can input information, filters, selections, etc., to specify for the system 12 what data is to be analyzed (e.g., as data set 14). In another example, the system can analyze an entire database, select elements of the database for analysis (e.g., identify database collections, which can be logical groupings of documents, based on being commonly accessed to respond to queries, based on usage, etc.), or perform a sampling step to identify elements of the database to analyze. According to some embodiments, the data analyzed can be any type of data (e.g., an image, a text file, a movie file, etc.), while in other embodiments, the type of data may be restricted to certain data types (e.g., text files, etc.).

In some embodiments, the data set 14 could possibly contain hundreds of thousands of documents, millions of documents, etc., and the user may therefore not want to analyze the entire data set 14. Thus, in one example, the user can input filters to reduce the data being analyzed, and/or select data in a user interface from named collections of documents appearing in the database. According to one embodiment, the system 12 is configured to sample data from a database as part of generating a virtual schema. In further embodiments, the system 12 includes a sampling component 16 that is configured to execute the sampling functions. For example, when the sampling component 16 is executed, the sampling component can be configured to execute any number of sampling methods. In one default configuration, the sampling component is configured to randomly sample a set number of documents from data being analyzed. In one example, the system 12 and/or sampling component 16 can be configured to randomly sample 1000 documents from any data being analyzed. In another example, the data set 14 may be sampled completely randomly with any number of documents being randomly selected. In further examples, the user is able to specify on the system 12 and/or sampling component 16 the number of documents to sample, e.g., 100 documents, 1,000 documents, 5,000 documents, etc.

In another embodiment, the user may selectively sample the data set 14, and may choose any number of documents to manually select. Furthermore, either the random sampling or the manual sampling may be recursively evaluated to achieve a desired level of correlation between sampling; for example, multiple samples may be collected and compared to calculate the correlation between them. In one embodiment, a process of selective sampling can include database analysis to select a sample that has a high probability of being representative of the database from which it is derived. In other embodiments, a plurality of samples can be collected and the set of attributes derived from the plurality of samples can be used by the system to generate a virtual schema.

According to other embodiments, the user may set a threshold for how closely correlated the samples must be in order for them to be considered an accurate representation of the data set from which they are sampled. In one example, the user may set a threshold for the number of documents to be sampled by the system (e.g., 100 documents, 50 documents, or 2,500 documents, among other examples). In another example, the user may specify a confidence level that the system is configured to attain. The confidence level can be based on taking multiple samples until a confidence threshold that the sample is representative of the entire data set is reached. For example, the system can be configured to capture multiple samples of the database until the confidence level is reached. In another example, multiple 1,000-document samples may be collected for analysis, and in still another example, the sample groups may vary in composition and number of documents.

In further embodiments, the system 12 can also include an analysis component 18. The analysis component 18 can be configured to analyze a portion of the data set 14, while in other embodiments, the analysis component 18 can be configured to analyze the entire data set 14 as a whole. According to at least one embodiment, the analysis component 18 is configured to capture information about the sample set, and based on this information, create a virtual schema or model for the data set 14 or entire database. This virtual schema can be used as a structure for characterizing a data set 14 of disparate documents, allowing a user to easily evaluate documents that are not intrinsically related by a unifying schema. Furthermore, in some embodiments, the data set 14 being analyzed may comprise only a portion of the database from which it is captured. Therefore, the user may, in one example, use the analysis performed on the data set 14 to infer the properties of a database from which it is derived, based only on a data set 14 comprising documents that are not inherently related by a universal schema.

In one example, the analysis performed by the analysis component 18 may involve recording the number of times that an attribute appears throughout all of the documents making up the analyzed portion of a data set 14, as well as recording the values associated with those attributes. For example, the user may be interested to know which attributes are most commonly-appearing within the data set 14, and may wish to analyze the trends within the values associated with those attributes. The information captured by the analysis component 18 may be displayed in a number of ways, such as by graphs tailored to the type of values analyzed by the analysis component 18. For example, the displays may be bar graphs, line graphs, pie charts, or any other known medium to visually display data to a user. In further examples, visualization of the properties derived from the sample data enable the end user to quickly and efficiently navigate to documents having the derived properties that are of interest (discussed in greater detail below).

In another example, the analysis component may identify the most commonly-appearing value throughout the entire data set 14 across every attribute in the data set 14, and can identify trends in the values associated with each individual attribute. The approach used to display the values associated with one attribute may follow the same or a different display approach to display the values associated with a different attribute. In one example, the attributes may be displayed in order of frequency-of-appearance in the data set 14, listed in ascending- or descending-order.

According to one implementation, documents stored in the known MONGODB database each share an "_id" attribute. When coupled to the "_id" attribute, the system is configured to store creation information representing the date and time that the associated document was created. The _id attribute may be any BSON type—one example would be a time stamp. The combination of the "_id" field and a creation date provides important information for inferring information regarding database operation and write usage, and provides a significant opportunity for optimization of the database. For example, based on the date and time of creation, a user may identify high-usage periods and allocate additional hardware accordingly.

According to another embodiment, the visualization of the properties identified by the analysis component 18 can be mapped to the underlying documents that generated the properties, and in further embodiments, the user is capable of altering the way the data is displayed as well as what elements of the data are being displayed. For example, by selecting certain elements of data being displayed, a user may further expand on the information being displayed by that element of the data. Alternatively, the user may drag elements of the data to a search refinement bar to expand on the information pertaining to that element of the data. In one example, dragging attributes displayed by a visualization into the search refinement bar will cause the system to automatically apply the attribute as a filter on the analyzed data.

In further embodiments, the system retains information that pertains to the sampled data and is used to present the visualizations and attribute information to the user, which enables the system to generate the corresponding filter. For example, resolving the appropriate filter that matches the sampled context being displayed is not possible for the typical end user, and presents significant obstacles even to expert users. In further examples, each time the system accesses a data set the data is randomly sampled.

In further examples, the user may choose to omit certain attributes from the information displayed, or may set one or more thresholds for the minimum or maximum number or portion of documents that an attribute or an associated value appears in, before it is used as part of the virtual schema.

According to one embodiment, the system 12 can include a visualization component 20. The visualization component 20 can be configured to generate user interface visualizations based on the sampled data, the entire database, and the analysis executed by the analysis component 18. According to one embodiment, the visualization component 20 is configured to generate a navigable user interface based on a virtual schema derived from the sampled data. In some examples, the visualization component 20 is configured to create information displays for a user with user-selectable visualizations created by the visualization component 20. In further examples, the visualization component 20 can be configured to create easily-understood information displays, thereby reducing the complexity associated with understanding the complete database. Various visualizations generated by the visualization component 20 are associated with the underlying documents from the sample data, such that, responsive to a user selection, the system alters the visual display. The display may be altered to show further information associated with the underlying data, or transition directly to the document(s) associated with the visualization.

In one example, the visualization component 20 generates a display of a probabilistic or virtual "schema" 21A built from the data set 14 by the analysis component 18 and output by the system 12. According to one aspect, a virtual schema 21A may be built only around the sampled portion of a data set, and analysis may not need to be performed on the unsampled portion of the data set. However, the user may infer properties of the data set from which the sample derives based on, in one example, the analyzed portion of the data set. Therefore, according to one embodiment, the virtual schema 21A of the sampled portion of the data can be interpreted by the user to represent a probabilistic model of the whole data set. That is to say that, in at least one example, the user may make inferences about what the whole data set probably contains based on what the analyzed portion of the data set actually contains.

In some examples, the user may be interested in data statistics 21B output by the system 12, such as the most commonly-occurring attributes in the sample. The system may, in one example, display the four or five most commonly-appearing attributes in the sample when the visualization component 20 is executed in one embodiment. In some embodiments, the user may specify a number of attributes to visualize for the virtual schema. In other embodiments, the system may include a default for a number of attributes to incorporate, and in still others, an appearance value (e.g., more than 30% of sampled documents) may be used to limit the number of attributes displayed. In at least one embodiment, however, the user is not limited to a specific number of attributes to display, and may specify any number of attributes to be visualized upon execution of the visualization component 20. In some examples, attributes such as the "_id" or "date" fields may be visualized, as explained in further detail below.

While the visualizations can be displayed to an end user via functions executed by the visualization component 20, the user is also capable of interacting with the user interface being displayed by the visualization component 20. This allows the user to switch, widen or tighten the display criteria at any time.

Figure 2:
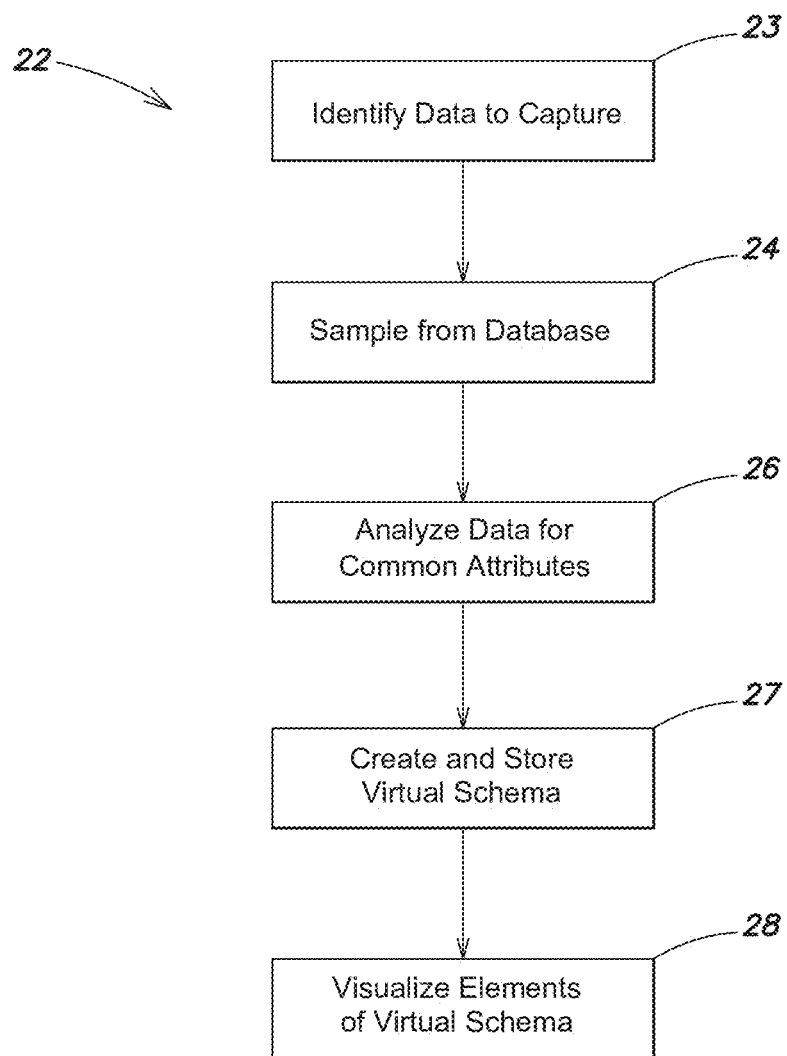
FIG. 2 shows a process flow diagram of the sampling, analysis and visualization generation processes, according to one embodiment.

FIG. 2 shows an example process flow 22 for analyzing a data set (e.g., data set 14) and displaying information to a user. The process flow 22 can be executed by a special purpose computer system to generate a virtual schema and display user interfaces. In one example, the user interfaces enable navigation of a sampled data space based on the virtual schema or model of a non-relational database.

Process flow 22 begins at 23 with identifying the database or a portion of the database on which to capture sampled data. For example, if the user so chooses, the user may identify a portion of a database rather than an entire database as a whole. In one example, the number of documents to be sampled can be selected by the user. In another example, the number of documents specified can be used to fine-tune a threshold associated with a confidence interval, where the confident interval describes the probability that a sample accurately represents the database or data set. According to one embodiment, the threshold can define the minimum amount of certainty desired by a user that a given sample accurately represents the database or data set from which it is derived. Because increasing the number of documents sampled will generate a more accurate depiction of the data set 14 as a whole, the number of documents sampled can be increased to commensurately increase the confidence threshold. In another embodiment, the system can be configured to automatically increase the number of sampled documents until a specified threshold is met. In another, the system can be configured to repeat samples until a specified threshold for the confidence interval is met.

In one example, 1000 documents can be identified for sampling during a sampling from a database at 24. In other examples, the number of documents sampled can be any system specified number (e.g., 100, 500, 2000, etc.) or a number of documents set by a user. In one example, the system can run a specified sample, and display a confirmation dialogue to the end user. If comfortable with the results, the user can accept the system's sample or the user may indicate that the system should sample additional documents (e.g., number specified by user in the UI or system doubles sample number, increases sample by 50% and presents confirmation dialogue again, etc.) According to one embodiment, the 1000 documents can be used as a "window" into the contents of the data set 14 from which they are derived. In some embodiments, the window provides the user with a probabilistic model of the entire data set 14, and execution of the process flow 22 can include generating visualization for displaying one or more elements of the probabilistic model.

The process flow 22 is not limited to randomly selecting 1000 documents during sampling at 24. For example, the system may randomly sample 50 documents (or any other number of documents) as per the user's specifications or system-defined sample sizes. In another example, the sampling need not be random.

According to one embodiment, the user may manually identify any portion of the database (e.g., at 23) to be used in the sampling step at 24, and the sampling step at 24 need not be limited to a single group of documents, a single collection of documents, etc. For example, the sampling at 24 may include sampling from multiple groups of documents of the same or different sizes and may be recursively evaluated to determine the correlation between the disparate document groups. According to one embodiment, the system enables the user to set a minimum or maximum threshold for how correlated the sample results must be in order for the sampled data to be considered to be acceptable.

According to another embodiment, the sampled data can next undergo analysis at 26. For example, the sample data can be analyzed to determine a set of common attributes at 26. A document contained in the sampled data can comprise many attribute-value pairs, and in at least one embodiment, the number of times that each attribute appears in a given sample is recorded along with each attribute's associated value during the analysis at 26. According to one embodiment, by identifying trends within the sample data during analysis at 26, the identified trends can be used to create a model of the sample data, where the model is representative of the database as a whole (or the identified portion of the database). The model is probabilistic relative to the database as a whole as it is based on a sample from the database as a whole.

According to various embodiments, the model of the sample data can be used to create and store a virtual schema at 27. In some examples, some of the trends identified in the data (e.g., large percentage appearance of an attribute, ranked appears of attributes, etc.) can be used to build the virtual schema. In one example, the top-ranked four or five attributes (ranked by prevalence of appearance) are selected from the identified trends to build the virtual schema. In other embodiments, execution of process 22 can include retrieval of settings specifying lower appearance boundaries for inclusion in the virtual schema and/or upper appearance boundaries for inclusion in the virtual schema. As discussed, the virtual schema can be used to create a "window" into the trends and contents of the database by providing a probabilistic model of data architecture for the analyzed data.

According to some embodiments, the window into the data can be fine-tuned based on system settings. For example, users can define relevancy criteria on the system (e.g. top-ranked attributes based on appearance, top-ranked results can exclude attributes appearing in too many documents based on additional settings, among other options). In other embodiments, the system can include default settings that establish threshold values (e.g., threshold appearance rates) used by the system to identify the top appearing attributes.

In one example, a user may want to know which attributes appear most often in a sample and the user can thus access a display of the virtual schema or a display of respective elements of the virtual schema (e.g., as created and stored at 27). In one example, a visualization component (e.g., 20, FIG. 1) may be configured to display the virtual schema generated with any attributes appearing in descending order of frequency-of-appearance within the documents making up the sample. In another example, a visualization component (e.g., 20, FIG. 1) is configured to display the attributes from the virtual schema in ascending order of frequency-of-appearance. The user may also select a function in the user interface to re-order such displays. If the user wishes to know which attributes are rare or anomalous in the sample, the user may specify "least frequency" ordering. Analysis of the sampled data can provide information for both viewing modes, and respective user interfaces are configured to accept user selection to transition between both display modes. Either visualization offers a unique "window" into the sample data, which may be interpreted by the user to make inferences about the data set from which it is derived.

In a further embodiment, the user may be interested to know how the values associated with the displayed attributes are distributed within the sample set. For example, one of the commonly-appearing attributes in the sample may be "age," wherein the value associated with each occurrence of the "age" attribute may be the age, in years, of a person. According to one embodiment, the process flow continues at 28 with generation of visualizations for the attributes of the virtual schema. For example, the step of visualizing elements of the virtual schema at 28 can include graphing the distribution of age values as a function of frequency-of-occurrence. If the sample contains a large number of 20-year-olds, for example, then the step of visualizing elements of the virtual schema at 28 can include creating a graphical display that shows this trend and highlights these maxima. In one example, visualizing at 28 can include generation of visual elements associated with such maxima, and in further examples, can include generating a bar graph showing the distribution of attribute values in the sampled data. Each element of the bar graph can be selectable in the user interface to transition the user interface to detailed views of respective documents from the sampled data set. For example, each element of the bar graph (e.g., 48 or 50 of FIG. 3) is associated with one or more documents from the sampled data set. Selection of any of the bars shown can transition the user interface to display the associated documents. In one alternative, selection of one of the displayed elements in the bar graph can generate a query for selecting the documents associated with the visual display. In another example, the selection of any of the visual elements (e.g., bar graph display) in the virtual schema display can be configured to generate a targeted query that selects the sampled data and the additional attributes being selected in the user interface. Visualizing elements of the virtual schema 28 can, in some examples, create views detailing, and helping a user to navigate, information about certain (e.g., the most commonly-appearing) attributes.

According to one embodiment, query generation can be triggered via selection in the virtual schema display. In one example, the system is configured to generate any query necessary to first select the sampled data being analyzed, and then further refine the query to target attributes being selected in the display. In another embodiment, the generated query can be displayed in the "refine query" section of the display.

Although the user can view the information displayed by the process of visualizing elements of the virtual schema 28 through a user interface 30 in at least one example, the user is not limited to such a passive role of merely viewing the information displayed. For example, in one embodiment, the user can utilize the user interface 30 to further manipulate and refine the graphical depictions of the underlying data. In one scenario, an attribute of interest may be an "email" attribute, with a number of email addresses associated with the "email" attribute as values. Should the user operating the user interface 30 wish to know how many of the email address values are associated with a "gmail.com" domain name, for example, the search results may be easily refined to reflect the percentage of emails registered to the "gmail.com" domain within the analyzed data.

Figure 5:
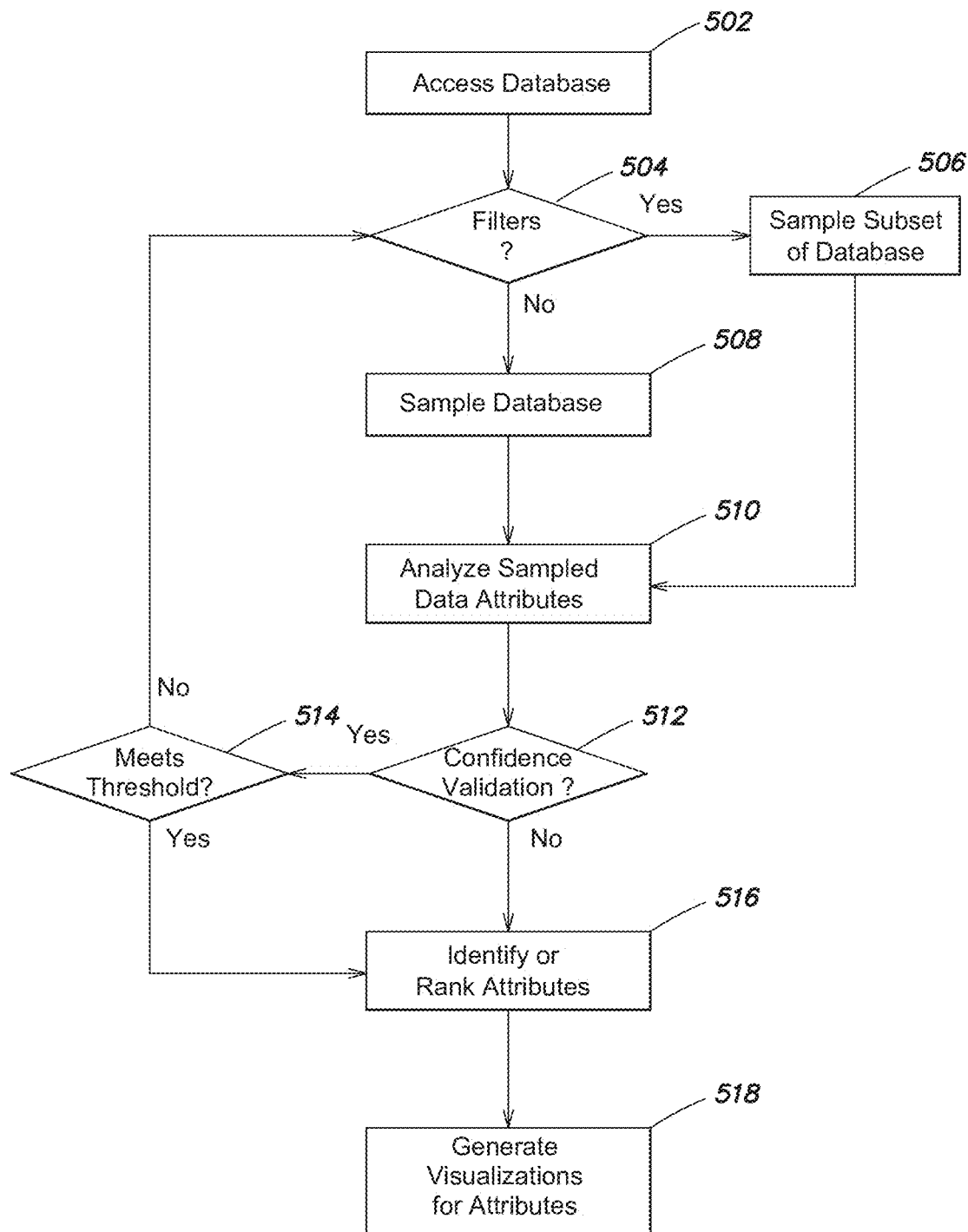
FIG. 5 shows a detailed process flow diagram of the sampling, analysis and visualization generation processes.

FIG. 5 is another embodiment of a process flow 500 for generating and visualizing a virtual schema for a database. The process flow 500 begins by accessing a database 502 to be analyzed. If the user has input filters 504 for analyzing the database, a portion of the database meeting the filter criteria is selected for sampling. Process flow 500 continues to step 506 where a subset of the database is sampled according to the specified filters in lieu of the database as a whole. In one embodiment, the user can select any filters desired to limit the criteria used to select portions of the database for sampling 504YES. According to one aspect, if no filters are specified 504NO, then the process flow 500 can sample the entire database 508 as a whole.

Whether sampling the entire database or just a filtered subset, the data attributes of the sample are, in one example, analyzed at step 510. Based on this analysis, a virtual schema can be built to provide a probabilistic model of the architecture of the sampled data. In some embodiments, the user can specify a confidence validation step 512, executed to confirm that the sampled data meets a confidence threshold specified by the user. This confidence threshold represents, in one embodiment, the statistical likelihood that the contents of a data sample are accurate representatives of the database or subset of the database from which the sample is taken.

In one example, if a confidence validation has been set by the user, the process flow 500 continues to step 514 to evaluate the confidence level of the sample against the threshold (e.g., set by the user or provided as a system default). If the confidence level fails to meet or exceed the confidence threshold specified by the user 514NO, then the process flow 500 returns to step 504 to evaluate whether filters have been specified for the sample set, and repeats the sample on all or a subset of the database accordingly. In some embodiments (not shown), the failure at 514NO can trigger an increase in the number of sampled documents during re-execution of steps 504-512 in addition to repeating the sample operations.

In one embodiment, if the confidence level meets or exceeds the threshold 514YES or if no confidence validation was specified by the user 512NO, the process continues to step 516 to identify and/or rank the attributes of the analyzed data. In some embodiments, the process can include a step to acquire and provide statistics about the attributes (e.g., a percentage of documents in which an attribute appears, etc.). In another embodiment, the process flow 500 continues to step 518, wherein visualizations are generated for the attributes identified and/or ranked in step 516.

In another example, the user may be interested to know what the distribution of email domain names is. In one embodiment, the email domain name may represent the domain to which the email address is registered; for example, in the email address "john.doe@gmail.com," the domain name is "gmail.com." The user may refine the user interface display to graph the spread of email domains, displaying the percentages of the whole sample that each email domain makes up. In another example, each email domain may be graphed as a function of the number of documents that contain each email domain instead of percentages. For example, a data sample may consist of five documents. Three of these documents may each contain email addresses belonging to the "gmail.com" domain name, while the two remaining documents may contain email addresses belong to the "aol.com" domain name. The user may specify a minimum or maximum number or percentage that each domain name must meet to appear on the graph. In the preceding example, if the user specifies that there must be at least three documents containing a specific domain name to appear on the graph, the "gmail.com" domain name would appear on the graph while the "aol.com" domain name would not, as it only appears in two of the five documents. The information may be displayed in any known form of graph, such as a bar graph in one example, while in another example, the information may be displayed as a pie chart. Further opportunities for refinement are detailed below, specifically with reference to FIGS. 3 and 4.

Figure 3:
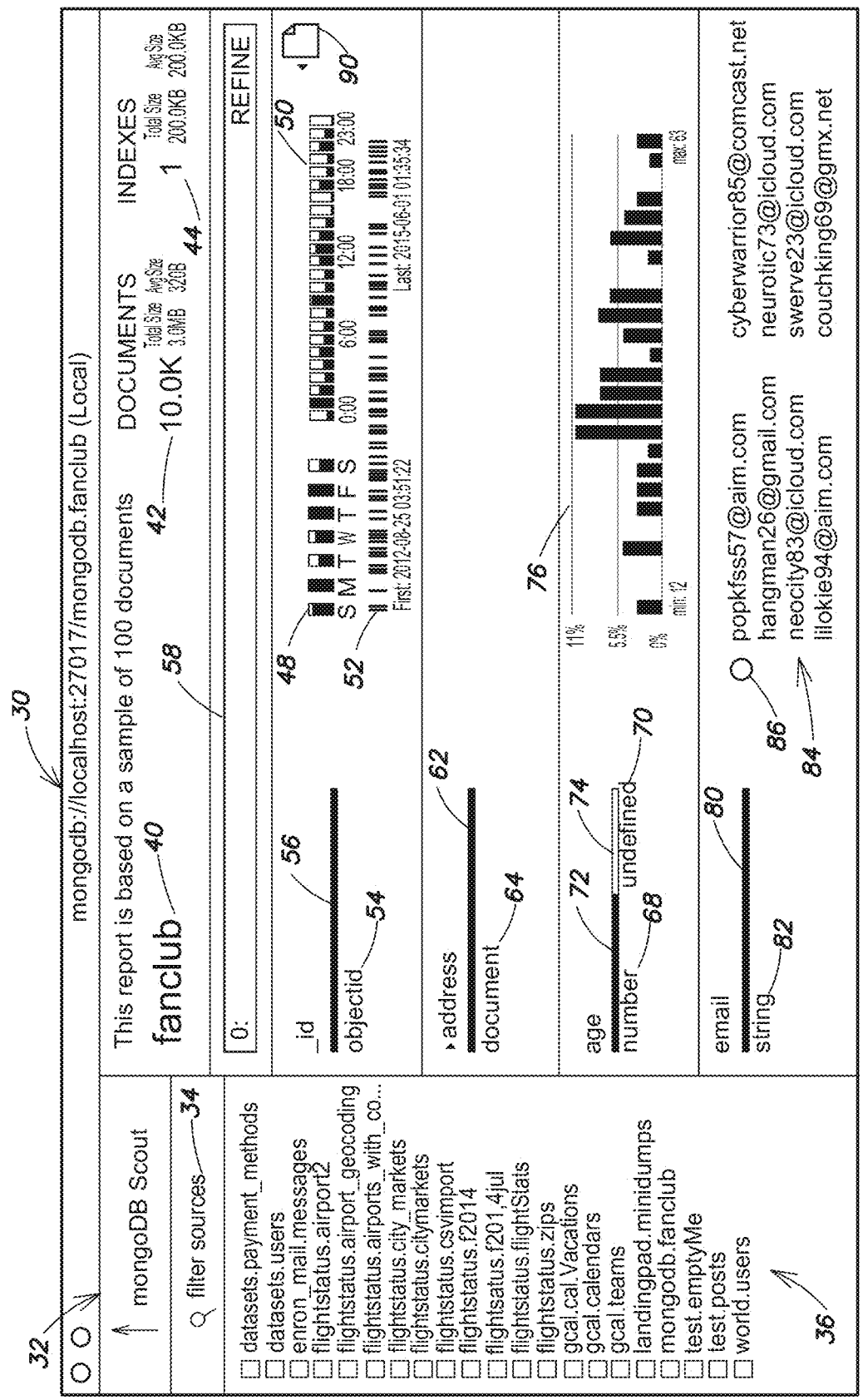
FIG. 3 shows one example of a user interface according to one embodiment.

FIG. 3 shows one embodiment of the user interface 30. A column 32 on the left-hand side of the user interface 30 comprises a search bar 34 with which to search through data sources, and specifies a plurality of collections 36 (e.g., named collections) that can be analyzed. In one example, the search bar 34 enables the user to filter through all the possible collections 36 within a database quickly and easily.

In one embodiment, the user may select the named collection "mongodb.fanclub" from the plurality of collections 36 for further analysis. As previously mentioned, the selected collection can also be filtered to extract a data set 14, which can undergo a process of sampling 24 in response to selection in the user interface 30, for example. In another example, any number of documents can be sampled from a specified data set (e.g., data set 14). In various embodiments, the number of documents sampled can be selected randomly, based on a percentage of the specified data set, based on a set number, based on a system default setting, and/or selected manually.

Once the number of documents to sample has been determined, the data set is sampled and analyzed. The resulting analysis can be used by the system to generate graphical displays in the user interface showing, for example, the associated properties of the data. According to one embodiment, an information panel 38 at the top of the user interface 30 displays a number of properties pertaining to an example collection, including the name 40 of the collection, the collection's size information 42, and the collection's index information 44. In one example, information on the number of indices within a collection can be useful to an end user for inferring additional properties about the data. In some examples, the user interface can enable the user to compare the common attributes of the sampled data to the index or indices. In still other examples, the system can enable the user to create additional indices based on the attributes shown in the virtual schema.

The name field 40 can represent the name given to the named collection being analyzed. In the example shown in FIG. 3, for example, the name is "fanclub." The size information associated with the "fanclub" collection can be displayed via field 42, which can include information such as the total number of documents within the collection, the total memory allocation for the collection, and the average memory requirement per document in the collection. In the example illustrated by FIG. 3, the total number of documents is shown to be 10,000. Each document has an average size of 320B, yielding a total size of roughly 3 MB for all of the documents in this example.

The user interface 30 can also display the most commonly-appearing attributes from the analyzed portion of the data set in one embodiment, as discussed above. Although the example of the user interface 30 shown in FIG. 3 displays four attributes, the user interface 30 may display any number of attributes. This number can be set by the user in at least one example and is not limited to any minimum or maximum number of attributes being displayed.

In some examples, an attribute may be subject to certain rules if a value associated with the attribute exceeds a certain user-specified threshold of appearance. For example, if a specific attribute (e.g., state of residence) has a value (e.g., Massachusetts) that appears in more than a certain user-defined threshold (e.g., 95%) of instances of that attribute, then the user may specify that that attribute may not be displayed by the user interface 30. In other embodiments, the user may specify that the attribute should be displayed by the user interface 30, but be accompanied by a warning message.

In other instances, a minimum threshold may be applied to attributes, values or both. For example, a user may specify that a certain attribute (e.g., country of residence) be common amongst a certain minimum threshold of documents in a data set (e.g., 20%) in order to be displayed by the user interface 30. In other examples, a user may specify that an attribute (e.g., country of residence) must have a value (e.g., the United States of America) that appears in more than a certain user-defined minimum threshold (e.g., 20%) of all of the values associated with that attribute. Continuing with this example, if the most commonly-appearing value associated with an attribute only appears in 15% of the instances of that attribute, then the value would not meet the exemplary 20% minimum threshold, as none of the values associated with that attribute exceed the threshold. In some examples, failure to meet this minimum threshold may trigger the system to omit the identified attribute from the display by the user interface 30. In other embodiments, the attribute may still be displayed by the user interface 30 accompanied by a warning message.

In one environment, the "_id" attribute is one such commonly-appearing attribute as shown by the contents of an _id pane 46, and can include details regarding the time and date that the document containing the "_id" attribute was created. For example, a day bar graph 48 can be utilized to show the distribution of the documents' day-of-creation over a 7-day week, while a time bar graph 50 can show the documents' time-of-creation over a 24-hour period. In another example, a date-of-creation bar graph 52 can be displayed showing the distribution of dates that each document was created on. The date-of-creation bar graph 52 can also identify the date and time that the first- and last-created documents were created, in one embodiment. In further embodiments, the creation information displays provide usage information in a readily consumable format. In one example, an e-commerce provider may see a large distribution of documents being created around holidays, enabling optimizations through utilization of additional hardware at those times. Without such visualizations, extracting this information becomes complex and can be underutilized.

According to one embodiment, the user interface can include an _id pane 46 that includes a data type 54 identifying the type of value that is associated with each attribute, and a bar 56 identifying the portion of the sampled data or data values associated with each data type 54. In the example of the _id pane 46, the bar 56 is entirely filled with one color, denoting the fact that the "objectid" data type 54 is associated with all of the attributes within the _id pane 46. The user can hover their mouse pointer over the bar 56, in one example, to display the percentage of the values associated with each data type. In the embodiment shown in FIG. 3 by the _id pane 46, this percentage would be 100%, given that the "objected" data type accounts for the entirety of bar 56. Furthermore, the user can continue refining the results displayed at any time by clicking and dragging elements of the bar graphs 48, 50 and 52 to the refine bar 58. Responsive to dragging those attributes into the refine bar 58, the system can automatically create a filter based on the current sample and selected attribute, and refine the displayed data accordingly.

In at least one example, every document in a data set may be required to have an _id attribute containing metadata about the attribute. Users may indicate that the _id attribute should be omitted from the user interface 30 if desired, because, as previously mentioned, some embodiments of the data set may be required to have an _id attribute. As such, displaying an _id attribute may not provide a beneficial "window" into the data set if the user already knows that the attribute will be associated with every document. In other embodiments, the _id field is used to provide further appreciation of metadata associated with document creation in the database. The _id field can be used to provide analytic information associated with the data. In one example, the _id field provides information including a creation date of respective documents in the database. Mappings of the creation date and other visualizations of analysis of the creation date (e.g., time bar graph, day of the week, time of day, etc.) can be presented to an end user that are associated with creation and/or modification of the respective document. The visualizations of the analytic information can each be selectable to accesses associated grouping. Click and drag selection of a portion of a time bar (e.g. FIG. 3 at 52) can trigger a query builder and execution of the query in the sample data set. The user interface can transition the user to a display of those results. Further, in some examples, the built query can be captured and executed on the database as a whole. The result of the query on the database as a whole (or other selections within the database) can provide a basis to compare sample data against any other sets. In some embodiments, side-by-side visualizations can be presented to an end-user for the query results in the sample set and for the query results from another data set (e.g., whole database, other collections, other selections, etc.). The side-by-side visualizations can include respective data analytics regarding, for example, creation date for ready comparison of metadata properties.

According to another embodiment, the system can be configured to analyze information from the virtual schema and the same attributes in the database as a whole or another section of the database. By tracking differences between the virtual schema and the target portion of the database (e.g., whole database, database collection, database portion, etc.), the system can be configured to take automatic actions. In one example, the system can automatically create indices for target portions of the database, and can be configured to generate such indices based on the virtual schema. In some embodiments, the system can be configured to trigger recreation of the virtual schema as the differences between the current virtual schema and the target portion of the database grow. For example, as the set of attributes appearing in the virtual schema becomes less representative of a target portion of the database, the system can be configured to trigger automatic recreation of the virtual schema (e.g., when the virtual schema exceeds a certain deviation from a target portion of the database).

Returning to FIG. 3, the address pane 60 represents another commonly-appearing attribute from the data set. Similar to the _id pane 46, a bar 62 corresponding to a data type 64 shows that all of the values belonging to the "address" attribute are associated with the "document" data type.

In further embodiments, an age pane 66 can comprise disparate data types. In one example, some data types associated with the "age" attribute can correspond to a "number" data type 68, while others may have not been properly assigned a data type. In one example, if a proper data type is not identified for a value, that value is an "undefined" data type 70. As previously mentioned, in one embodiment, the user may hover their mouse over either a shaded bar 72 associated with the "number" data type, or an unshaded bar 74 associated with the undefined data types, whereby a percentage will be displayed denoting the relative proportion of each data type associated with the value it describes. The UI can also be configured to transition to the underlying documents that generated each data type. Selecting "undefined" can transition the UI top a view of the documents where the age attribute is undefined, simplifying the operations required to correct improperly coded data.

Further, a bar graph 76 can display the distribution of values associated with the "age" attribute. In one example, the horizontal axis can denote ages in ascending order, while the vertical axis can denote the percentage that each individual age makes up of the total amount of recorded values. The bar graph 76 can also display the lowest and highest values associated with the age attribute, according to one aspect; in the example shown in the age pane 66, the minimum value is 12, while the maximum value is 63. According to one embodiment, the user can further refine the display to only show data corresponding to the "number" data type 68, if desired, by clicking on the corresponding bar 72. According to one aspect, doing so will modify the corresponding bar graph 76 to display only those values matching the "number" data type 68, omitting all values with an undefined data type 70.

Yet another featured attribute can be the "email" attribute, as shown by the email pane 78. It can be observed from the full bar 80 that all of the values of the email attribute are "string" data types 82, several of which are listed in the email display field 84. This list is selected randomly from all of the values corresponding to the email attribute, and can be refreshed to show another random sample, and the new sample can be redisplayed using the refresh button 86.

Figure 4A:
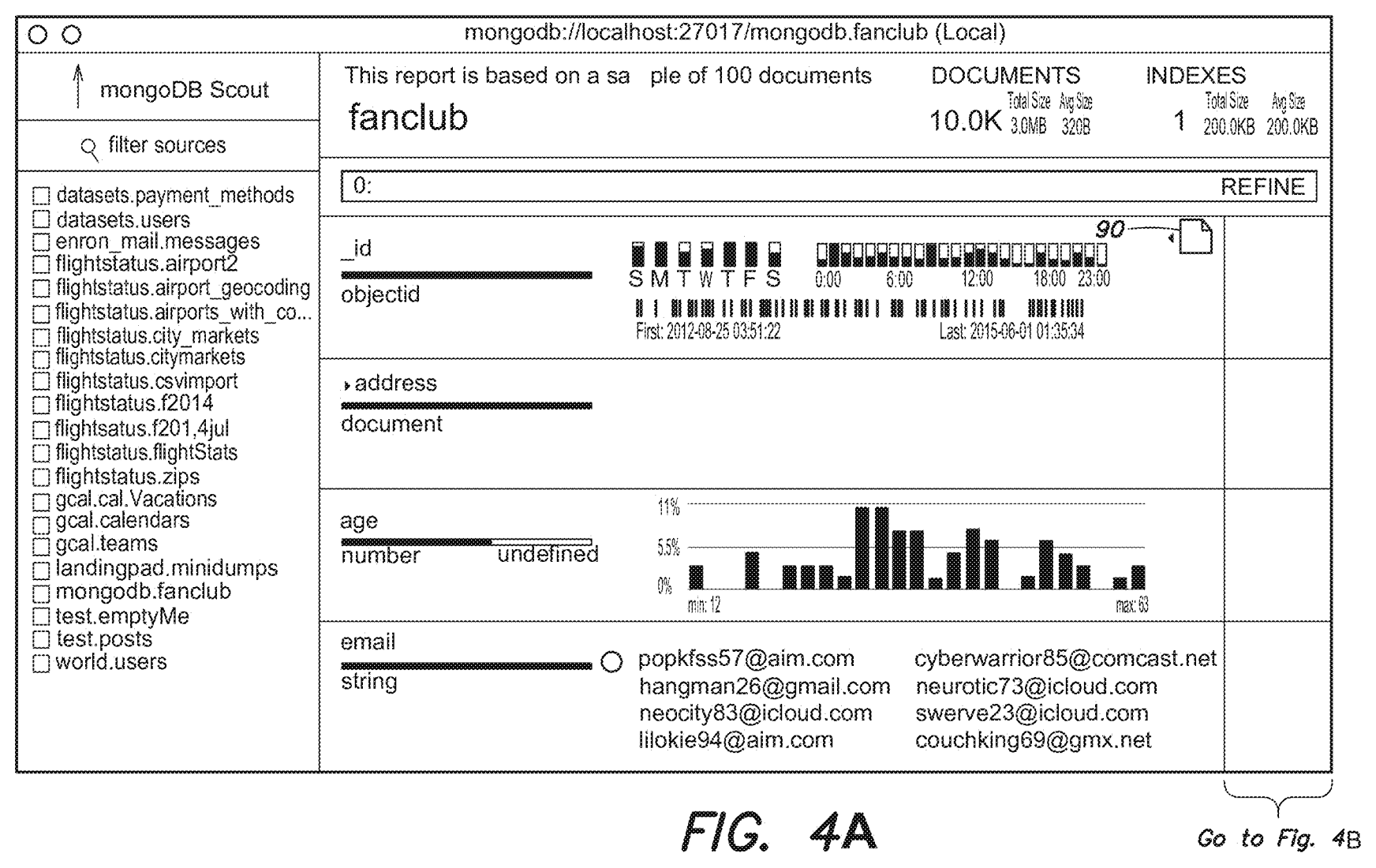
Figure 4B:
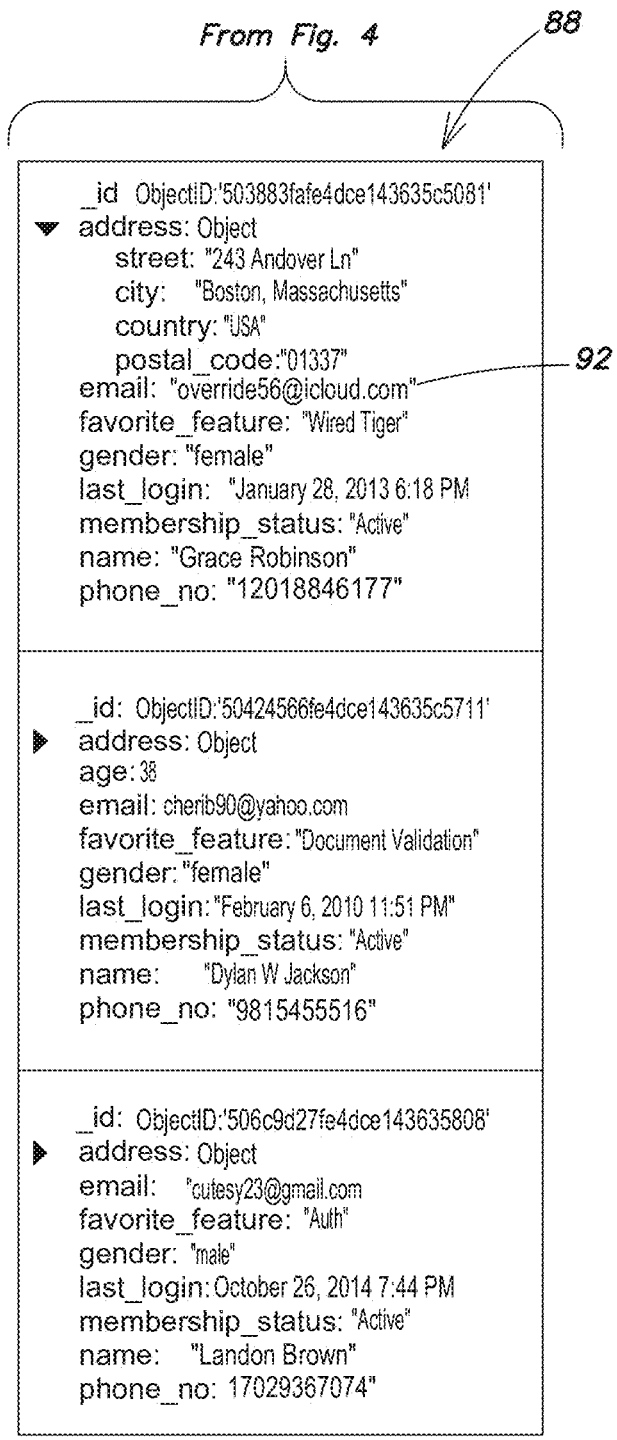

FIG. 4 shows another example user interface including a document view pane 88, which can be expanded or collapsed by pressing the document view button 90. For example, the UI can transition between the user interface shown in FIG. 3 and the user interface shown in FIG. 4, responsive to selection of the document view button 90. The document view pane 88 shows the individual documents sampled for a selected attribute, and their constituent attribute-value pairs. For example, the first document 92 in the document view pane lists the "email" attribute with a corresponding value "override56@icloud.com." The user may press the document view button 90 again to collapse the document view pane 88, returning to an interface display similar to that of FIG. 3.

In one example, responsive to the selection of the document view button 90 in FIG. 3, the system is configured to transition from the user interface shown in FIG. 3 to the user interface shown in FIG. 4. In another example, the user may transition back and forth between the user interfaces of FIGS. 3 and 4 using the document view button 90 while selecting different attributes to explore from either user interface.

The generation of the virtual schema provides a number of additional functions. In some embodiments, the attributes of the virtual schema can be selected in the user interface (e.g., that of FIG. 3 or 4) to create indices associated with the sampled data. The user interface can be configured to accept the selection of anywhere from one to all of the attributes from the virtual schema to create a new index. The user may set data validation rules based on the virtual schema to ensure that the data being analyzed is in a valid format. For example, an attribute may be "age" in one example, where the attribute represents the age, in years, of a person. The data validation rules may, therefore, be set to only allow values of the "int" data type to be submitted for the "age" attribute, as integers are commonly used to express age.

According to other aspects, the virtual schema can be generated by the system automatically and used to generate soft validation rules. Soft validation rules are configured to highlight to end users that data is not complete, not compliant, etc., while allowing the user to create or save non-compliant data. In other examples, the validation options can be strictly enforced—preventing the insertion or creation of non-compliant data. According to another example, if these validation rules are violated, warning messages may be displayed to the user in response to the validation error.

According to one embodiment, a virtual schema system enables users to access and execute tools for visually analyzing and understand any distributed database, and in particular distributed databases having dynamic or flexible schemas (e.g., MongoDB data). The system provides users with a graphical view of a virtual schema or virtual model of their respective data without requiring use of query language For example, in the known MONGODB database, data collections do not enforce a rigidly-defined document structure. The dynamic data structure can make it difficult to explore and understand the underlying data and any structure without a tool that automatically provides structural information to the user, and for example, in a manner users can understand. Further, to ensure minimal impact on database's performance, various embodiments are configured to sample (e.g., randomly) a subset of documents from a database collection, rather than perform analysis on an entire collection or database.

The virtual scheme systems enables a variety of functions to facilitate the end-user's understanding of the data and architecture that can be made available is any combination I some embodiments. Example Functions Enabled via virtual schema systems include: establishing data types and missing fields found in documents in a collection; understanding charts tailored to data types within collection; building queries interface, and visualizing individual documents in the data collection (as described in greater detail below).

According to one embodiment, the virtual schema system analysis a sample from a database or collection and displays the data types of fields found in a collection's schema (e.g., the most numerous fields). The example in FIG. 7A shows a report that there are documents in the collection that contain a field last_login with the type date. Shown in FIG. 7B, the virtual schema system can also display a percentage breakdown for fields with varying data types across documents. In the example shown in FIG. 7B, 81% of documents store phone_no as a string, and the remaining 19% store it as a number. For sparse data fields, including examples where some documents omit a value, the virtual schema system can be configured to display the percentage of missing values as undefined. Shown in FIG. 7C, the age field is missing in 40% of the sampled documents.

Figure 7E:
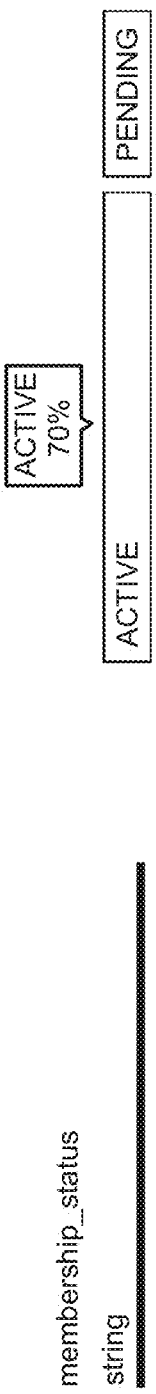
FIGS. 7A-P are display elements of a user interface, according to one embodiment.

According to some embodiments, the virtual schema system is configured to analyze data types and display different charts for data fields depending on their respective (e.g., BSON) type. For example, the virtual schema system can be configured to display Strings in at least three different ways. In one example, if all the documents in the collection have unique strings for a given field, the system is configured to display a random selection of string values. Shown in FIG. 7D is an example display for a string data type. In on example, the user interface display is configured to generate a new set of random strings sampled from the values for that field in response to selection of a refresh icon 720. In another example, if the system identifies only a handful of unique string values (e.g., 1, 2, 3, 4, or 5) the system is configured to show the strings in a single graded bar (FIG. 7E), indicating the percentage breakdown of string values.

Figure 7F:
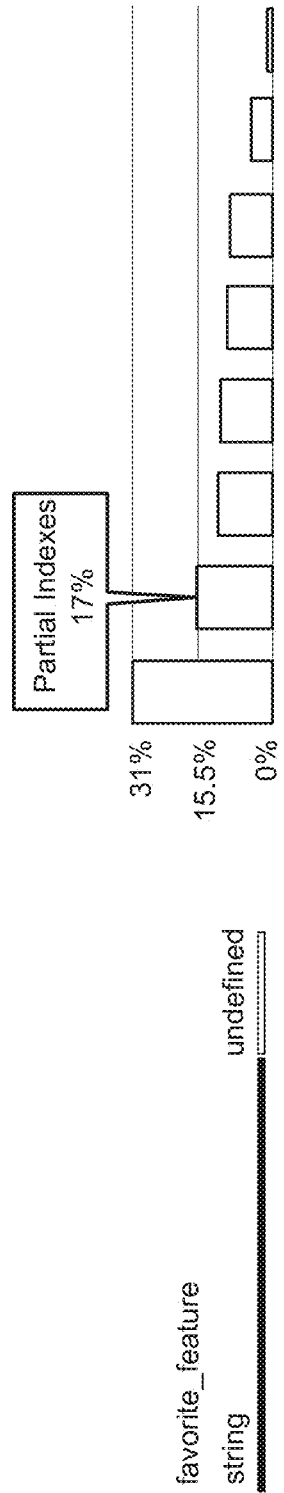

In another example, if the system identifies many different string values (e.g., >5, 6, 7, 8, 9 or 10) which may include some duplication, the system can be configured to display a histogram indicating the frequency of each string found for that field (FIG. 7F). In one embodiment, the user interface is configured to response to a hover via the mouse on each histogram bar to see a tool tip indicating the value of the string.

Figure 7J:
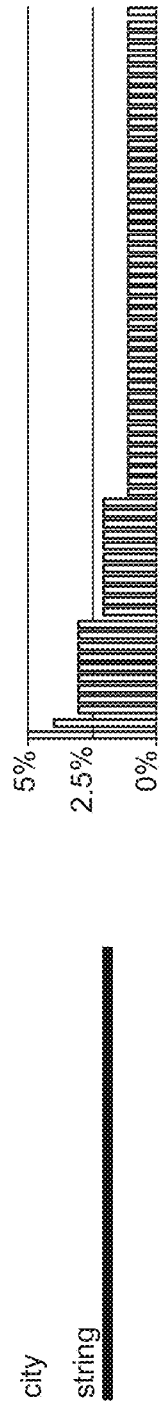
Figures 7K, 7L:
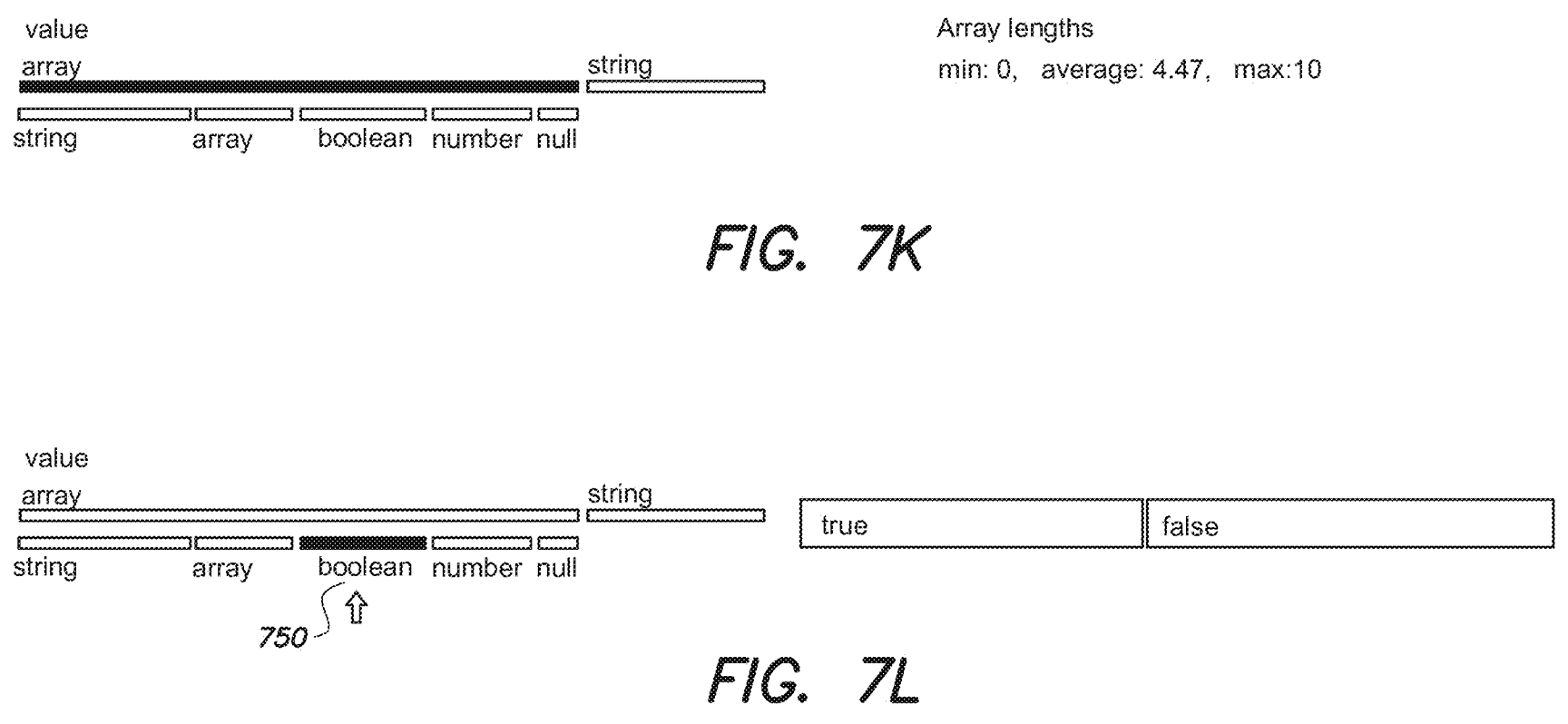

In another embodiment, the system, is configured to displays data having type numbers in a similar manner to strings. For example, a randomly-sampled subset of data is shown for an entirely unique data set (FIG. 7G). For a data set of type numbers containing duplicates, the system can be configured to show a histogram to indicate value frequency (FIG. 7H). In another embodiment, the system is configured to display sub-document fields with a visual indicator in the UI (e.g., a small triangle 730) next to the field name, along with some additional data (740 of FIG. 7I). In on example, selection of the visual indicator (e.g., the triangle) is configured to expand the field and view the sub-documents contained within (FIG. 7J). In another embodiment, the system is configured to display fields containing an array data type along with the type distribution of the array's elements. A second type distribution bar is displayed beneath the array type (FIG. 7K). In one example, the UI is configured to display a chart of the data for a specific type responsive to selection of an array sub-type (750 of FIG. 7L).

Figure 7M:

In another embodiment, the system is configured to display bar charts to represent data type: dates. Bar charts can also be used for fields containing an ObjectID data type, from which a date can be extracted. For example, FIG. 7M shows in the two charts on the top row (760 and 770 of FIG. 7M) visualization of the date fields' data: the first is the day of the week of the timestamp, and the second is the hour of day. The third chart in the bottom row (780) displays the range of timestamps: the earliest date, the most recent date and the distribution of all timestamps in between.

Figure 7N:
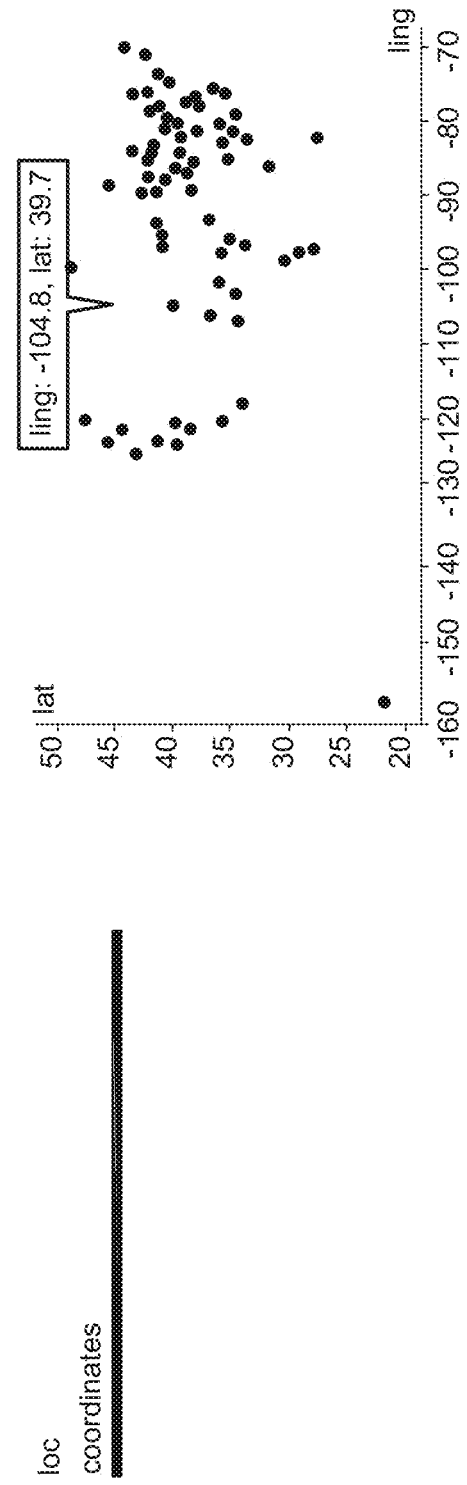

According to another embodiment, the system is further configured to detect values that look like geographical coordinates (e.g., the system identified longitude, latitude values or x,y data pairs) and display the data in a scatter plot. In other examples, the system identifies data types that specify locations (e.g., "loc"; "coordinates"; GeoJSON; coordinate pairs, etc.—FIG. 7N). The system supports and can be configured to identify both GeoJSON documents and legacy data types like coordinate pairs. In some embodiments, the user interface is configured to respond to hover actions. For example, hover over points in the scatter plot with the mouse cursor is configured to trigger the system to display a tooltip visualization with latitude and longitude coordinates.

Figures 7O, 7P:

According to another embodiment, the system is configured to identify fields having mixed types and enable uses to change the type of chart/display being shown by the system. In one example, the system and user interface is configured to respond to selection (e.g., clicking) on a specific data type underneath the field name. For example, the phone_no field of FIG. 7O is a mix of strings and numbers. The chart displayed shows the values that are strings by default based on the system identifying the greater frequency of the data type string for phone_no. Responsive to selection in the UI (e.g., a click) of the number data type 790, the system changes the visualization and displays the values that are numbers instead in FIG. 7P.

The various functions and/or processes described herein can be configured to be executed on the systems shown by way of example in FIGS. 1-5. The systems and/or system components shown can be specially configured to execute the processes and/or functions described. Various aspects and functions described herein, in accord with aspects of the present invention, may be implemented as specially configured hardware, software, or a combination of hardware and software on one or more specially configured computer systems. Additionally, aspects in accord with the present invention may be located on a single specially configured computer system or may be distributed among one or more specially configured computer systems connected to one or more communication networks.

For example, various aspects, components, and functions (e.g., sampling component, analysis component, visualization component, etc.) may be distributed among one or more special purpose computer systems configured to provide a service to one or more client computers, mobile device, or to perform an overall task as part of a distributed system. Additionally, aspects may be performed on a client-server or multi-tier system that includes components or engines distributed among one or more server systems that perform various functions. Consequently, examples are not limited to executing on any particular system or group of systems. Further, aspects and functions may be implemented in software, hardware or firmware, or any combination thereof.

Thus, aspects and functions may be implemented within methods, acts, systems, system elements and components using a variety of hardware and software configurations, and examples are not limited to any particular distributed architecture, network, or communication protocol.

Figure 6:
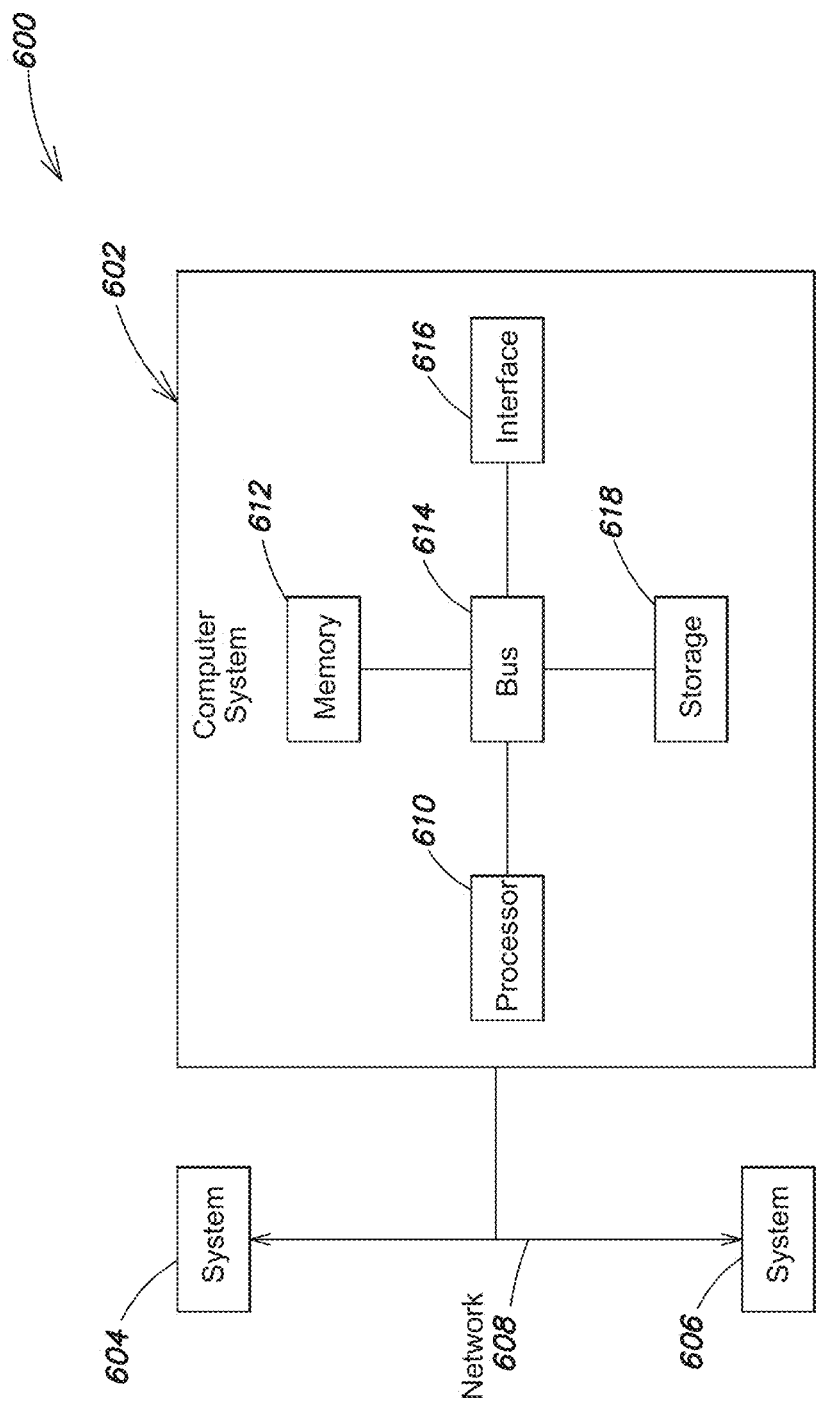
FIG. 6 shows a block diagram of a computer system in which various aspects of the present invention can be practiced.

Referring to FIG. 6, there is illustrated a block diagram of a distributed special purpose computer system 600, in which various aspects and functions are practiced (e.g., including a sampling component (e.g., configured to sample data from a data set), an analysis component (e.g., extracts attribute information from sampled data, correlates common attributes with source data, generates probabilistic data model of sampled data, etc.), a visualization component (e.g., builds user interfaces and navigable visualizations within the user interfaces, manages transition between data visualization in user interface, etc.), among other options). As shown, the distributed computer system 600 includes one more special purpose computer systems that exchange information. More specifically, the distributed computer system 600 includes computer systems 602, 604 and 606. As shown, the computer systems 602, 604 and 606 are interconnected by, and may exchange data through, a communication network 608. For example, a component of an analysis system and/or distributed database can be implemented on 602, which can communicate with other systems (e.g., 604 and 606), which host other or remaining portions of the database data, and or copies of the database data.

In some embodiments, the network 608 may include any communication network through which computer systems may exchange data. To exchange data using the network 608, the computer systems 602, 604 and 606 and the network 608 may use various methods, protocols and standards, including, among others, TCP/IP, or other communication standard, and may include secure communication protocols VPN, IPsec, etc. To ensure data transfer is secure, the computer systems 602, 604 and 606 may transmit data via the network 608 using a variety of security measures including, for example, TLS, SSL or VPN or other standard. While the distributed computer system 600 illustrates three networked computer systems, the distributed computer system 600 is not so limited and may include any number of computer systems and computing devices, networked using any medium and communication protocol.

As illustrated in FIG. 6, the special purpose computer system 602 includes a processor 610, a memory 612, a bus 614, an interface 616 and data storage 618 and further includes any one or more of the component discussed above to implement at least some of the aspects, functions and processes disclosed herein, as either a stand-alone system or part of a distributed system. In some embodiments, the processor 610 performs a series of instructions that result in manipulated data. The processor 610 may be any type of processor, multiprocessor or controller. The processor 610 is connected to other system components, including one or more memory devices 612, by the bus 614.

The memory 612 stores programs and data during operation of the computer system 602. Thus, the memory 612 may be a relatively high performance, volatile, random access memory such as a dynamic random access memory (DRAM) or static memory (SRAM) or other standard. However, the memory 612 may include any device for storing data, such as a disk drive, hard drive, or other non-volatile storage device. Various examples may organize the memory 612 into particularized and, in some cases, unique structures to perform the functions disclosed herein. These data structures may be sized and organized to store values for particular to specific database architectures and specific data types, and in particular, may include standardize formats for organizing and managing data storage.

Components of the computer system 602 are coupled by an interconnection element such as the bus 614. The bus 614 may include one or more physical busses, for example, busses between components that are integrated within the same machine, but may include any communication coupling between system elements including specialized or standard computing bus technologies such as IDE, SCSI, PCI and InfiniBand or other standard. The bus 614 enables communications, such as data and instructions, to be exchanged between system components of the computer system 602.

The computer system 602 also includes one or more interface devices 616 such as input devices, output devices and combination input/output devices. Interface devices may receive input or provide output. More particularly, output devices may render information for external presentation. Input devices may accept information from external sources. Examples of interface devices include keyboards, mouse devices, microphones, touch screens, printing devices, display screens, speakers, network interface cards, etc. Interface devices allow the computer system 602 to exchange information and to communicate with external entities, such as users, vendors, and other systems.

The data storage 618 includes a computer readable and writeable nonvolatile, or non-transitory, data storage medium in which instructions are stored that define a program or other object that is executed by the processor 610. The data storage 618 also may include information that is recorded, on or in, the medium, and that is processed by the processor 610 during execution of the program. More specifically, the information may be stored in one or more data structures specifically configured to conserve storage space or increase data exchange performance.

The instructions stored in the data storage may be persistently stored as encoded signals, and the instructions may cause the processor 610 to perform any of the functions described herein. The medium may be, for example, optical disk, magnetic disk or flash memory, among other options. In operation, the processor 610 or some other controller causes data to be read from the nonvolatile recording medium into another memory, such as the memory 612, that allows for faster access to the information by the processor 610 than does the storage medium included in the data storage 618. The memory may be located in the data storage 618 or in the memory 612, however, the processor 610 manipulates the data within the memory, and then copies the data to the storage medium associated with the data storage 618 after processing is completed. A variety of components may manage data movement between the storage medium and other memory elements and examples are not limited to particular data management components. Further, examples are not limited to a particular memory system or data storage system.

Although the computer system 602 is shown by way of example as one type of special purpose computer system upon which various aspects and functions may be practiced, aspects and functions are not limited to being implemented on the computer system 602 as shown in FIG. 6. Various aspects and functions may be practiced on one or more specially configured computers having different architectures or components than that shown in FIG. 6 which can be modified to include the special purpose components and/or functions discussed. For instance, the computer system 602 may include specially programmed, special-purpose hardware, such as an application-specific integrated circuit (ASIC) tailored to perform any one or more operations disclosed herein (e.g., sampling data, analyzing sampled data, generating a virtual schema, visualizing the virtual schema, among other examples). While yet another example system may perform the same function(s) using a grid of several computing devices running MAC OS System X with Motorola PowerPC processors and several specialized computing devices running proprietary hardware and operating systems.

The computer system 602 may be a computer system including an operating system that manages at least a portion of the hardware elements included in the computer system 602. Additionally, various aspects and functions may be implemented in a non-programmed environment, for example, documents created in HTML, XML or other format that, when viewed in a window of a browser program, can render aspects of a graphical-user interface or perform other functions.

Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g., specialized hardware, executable code, data structures or data objects, that are configured to perform the functions described herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

Use of ordinal terms such as "first," "second," " third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A system comprising:
   at least one hardware-based processor;
   a user interface component, executed by the least one hardware-based processor, operable to display at least one user interface, wherein the at least one user interface is configured to display and accept information associated with a non-relational database including documents as a base unit of data organization through information views, including:
   a first view configured to accept specification of a subset of data or an entire data set of the non-relational database; and
   a second view configured to:
      visualize a plurality of attributes within sampled data that comprise a virtual schema, for the non-relational database or a specified portion of the non-relational database, wherein the user interface component is configured to:
  access the sampled data and analyzed attributes of the sampled data to generate the visualization;
  receive user input specifying one or more new attributes not included in the virtual schema and the visualization;
  update the virtual schema to include the one or more new attributes from respective documents responsive to user selection;
  regenerate the second view to incorporate the new attributes;
a sample component, executed by the at least one hardware-based processor, configured to generate a sample of at least some documents responsive to selection of the subset of data or the entire data set in the first view;
an analysis component, executed by the at least one hardware-based processor, operable to:
  identify the plurality of attributes from a set of attributes in the sampled of documents, wherein the set of attributes includes at least some attributes that are not common between documents within the sampled data, and wherein the plurality of attributes are identified based on a frequency of occurrence in the sample data; and
  integrate user selected attributes into the set of attributes from the sampled documents; and
wherein the user interface component is further configured to generate selectable mappings in the second view between visualizations of the common attributes and the sampled data associated with the common attributes.

2. The system of claim 1, further comprising a visual query builder element displayed in conjunction with the first and second view, wherein the visual query builder element is configured to display a textual query based on visual selections made in the second view.

3. The system of claim 1, wherein the user interface component is further configured to generate a management view comprising at least the first view and the second view, wherein the display of the second view is dynamically generated responsive to identified respective data types within the plurality of common attributes.

4. The system of claim 3, wherein the user interface component is further configured to limit virtual schema definition to a defined threshold for a number of attributes to include in the virtual schema.

5. The system of claim 3, wherein the management view further comprises the visual query builder element.

6. A system comprising:
at least one processor operatively connected to a memory, the processor when executing being configured to:
accept a specification of a subset of data or an entire data set of a non-relational database having documents as a base unit of data organization;
sample from the subset of the data or the entire data set to create sampled data responsive to selection of the subset of data or the entire data set;
identify a plurality of common attributes from a set of attributes in the sampled data, wherein the set of attributes includes at least some attributes that are not common between documents within the sampled data, and wherein the plurality of common attributes are identified based on a frequency of occurrence within the sample data to build a virtual schema from the sampled data;
generate a visualization of the plurality of common attributes, and generate mappings to the sampled data associated with the plurality of common attributes;
receive user input specifying one or more new attributes not included in the virtual schema and the visualization;
update the virtual schema to include the one or more new attributes responsive to user selection; and
regenerate the visualization to include the one or more new attributes and generate mappings to respective documents associated with the one or more new attributes.

7. The system of claim 6, wherein the processor is configured to randomly sample the database to create the subset of data.

8. The system of claim 6, wherein the processor is configured to selectively sample the subset of data or the entire database.

9. The system of claim 6, wherein the processor is configured to sample the subset of data or the entire database until a confidence level received from the user is met.

10. The system of claim 6, wherein the system is configured to receive specification of a subset of data from a user.

11. The system of claim 6, wherein the system is configured to generate specification of a subset of data automatically.

12. The system of claim 11, wherein the system is configured to analyze data usage information or other attributes to automatically generate the specification of the subset of data.

13. The system of claim 6, wherein the system is configured to identify common attributes further based on a ranked order of the attributes.

14. The system of claim 13, wherein the system is configured to limit the number of attributes listed in the ranked order of the attributes, based on determining that the number of attributes meets or exceeds a threshold.

15. A method for generating a virtual schema in a non-relational database, the method comprising acts of:
  accepting, by a processor coupled to a memory, specification of a subset of data within a non-relational database or the entire non-relational database having documents as a base unit of data organization;
  sampling, by the processor, from the subset of data within the non-relational database or from the entire non-relational database responsive to selection of the subset of data or the entire data set;
  identifying, by the processor from within the sample, a plurality of common attributes with which to build a virtual schema, wherein the plurality of common attributes include at least some attributes that are not common between documents within the sampled data, and wherein the plurality of common attributes are identified based on a frequency of occurrence; and
  generating, by the processor, visualizations of the common attributes, and mappings to the sampled data associated with the plurality of attributes;
  receiving, by the processor, user input specifying one or more new attributes not included in the virtual schema and the visualization;
  updating, by the processor, the virtual schema to include the one or more new attributes responsive to user selection; and
  regenerating, by the processor, the visualization to include the one or more new attributes and generating mappings to respective documents associated with the one or more new attributes.

16. The method of claim 15, wherein the act of sampling from the subset of data or from the entire database includes an act of randomly sampling from the subset of data or from the entire database.

17. The method of claim 15, wherein the act of sampling from the subset of data or from the entire database includes an act of selectively sampling from the subset of data or from the entire database.

18. The method of claim 15, wherein the act of sampling from the subset of data or from the entire database may be performed until a confidence received from the user is met.

19. The method of claim 15, wherein the act of accepting specification of a subset of data includes receiving the specification from a user.

20. The method of claim 15, wherein the act of specifying a subset of data is performed automatically.

21. The method of claim 20, wherein the act of automatically specifying the subset of data is based on data usage information or other attributes.

22. The method of claim 15, wherein the act of identifying common attributes is further based on a ranked order of the attributes.

23. The method of claim 15, further comprising:
processing a visual range selection for values of respective attributes displayed in the second view based on selecting within an upper display boundary and lower display boundary;
receive a visual range selection for values beyond one of the upper or lower display boundary shown for the values of respective attributes;
expand a visualization of document data and respective display of respective attributes responsive to executing a query on the non-relational database or the specified portion of the non-relational database targeting additional data beyond the upper and lower display boundary.

* * * * *